United States Patent [19]
Donnelly

[11] Patent Number: 5,946,711
[45] Date of Patent: Aug. 31, 1999

[54] SYSTEM FOR LOCKING DATA IN A SHARED CACHE

[75] Inventor: Stephen Donnelly, Bedford, Mass.

[73] Assignee: Oracle Corporation, Redwood Shores, Calif.

[21] Appl. No.: 08/866,431

[22] Filed: May 30, 1997

[51] Int. Cl.$^6$ .................................................. G06F 12/14
[52] U.S. Cl. ........................................ 711/152; 711/130
[58] Field of Search .................................. 711/130, 147, 711/150, 151, 152, 205, 206, 203

[56] References Cited

U.S. PATENT DOCUMENTS

| | | | |
|---|---|---|---|
| 4,975,833 | 12/1990 | Jinzaki | 364/200 |
| 5,179,702 | 1/1993 | Spix et al. | 395/364 |
| 5,297,269 | 3/1994 | Donaldson et al. | 395/425 |
| 5,345,588 | 9/1994 | Greenwood et al. | 395/677 |
| 5,394,555 | 2/1995 | Hunter et al. | 395/800 |
| 5,414,840 | 5/1995 | Rengarajan et al. | 395/600 |
| 5,459,862 | 10/1995 | Garliepp et al. | 707/8 |
| 5,475,858 | 12/1995 | Gupta et al. | 395/800.29 |
| 5,535,116 | 7/1996 | Gupta et al. | 364/134 |
| 5,566,315 | 10/1996 | Milillo et al. | 711/113 |
| 5,613,086 | 3/1997 | Frey et al. | 711/152 |
| 5,636,355 | 6/1997 | Ramakrishnan et al. | 711/113 |
| 5,642,495 | 6/1997 | Ammann et al. | 711/153 |
| 5,684,993 | 11/1997 | Willman | 395/677 |
| 5,761,670 | 6/1998 | Joy | 707/103 |
| 5,788,429 | 7/1998 | Sukegawa et al. | 711/129 |
| 5,860,101 | 1/1999 | Arimilli et al. | 711/121 |

FOREIGN PATENT DOCUMENTS

WO 95/25306  9/1995  WIPO.

OTHER PUBLICATIONS

Li, K., "Shared Virtual Memory on Loosely Coupled Multiprocessors," YALEU/DCS/RR—492, Yale Unversity, Department of Computer Science, pp. 1–209, (Sep. 1986).

Berson, A., *Client/ Server Architecture*, Second Edition, McGraw–Hill Series on Computer Communications, (1996), Chapter 4, "Server Specialization in the Client/Server Environment," pp. 99–131, Chapter 16, "Technology and Advanced Applications of Data Warehousing," pp. 463–501.

Baylor, Sandra J., et al. "An Evaluation of Cache Coherence Protocols for MIN–Based Multiprocessors," *International Symposium on Shared Memory Multiprocessing*, pp. 230–241 (Tokyo, Japan, Apr., 1991).

*Primary Examiner*—Eddie P. Chan
*Assistant Examiner*—Kevin L. Ellis
*Attorney, Agent, or Firm*—Hamilton, Brook, Smith &Reynolds, P.C.

[57] ABSTRACT

In a multi-threaded computing system, a locking system is utilized to cooperatively manage a shared cache between a plurality of user threads and a paging manager thread. To manage the locks, the paging manager maintains pointers between a process memory space assigned to each user thread, a global system data structure assigned to each user thread, and a page control block for each locked page in memory. These pointers and additional flags identify locked pages and their owners, and facilitates cleanup of stale locks.

34 Claims, 10 Drawing Sheets

SYSTEM FOR LOCKING DATA IN A SHARED CACHE

BACKGROUND OF THE INVENTION

In a large scale computer system, such as a database management system (DBMS), it is important to be able to support a number of different users concurrently. Without such a capability, the system would be little more than a standalone computer. To implement multi-user support, several different processing models have been utilized to manipulate data. One model that has been used is the multi-processing model. In multi-processing, each time a new user requests access to the system, a separate process is started. This process is in essence a separate execution of the software. Once started, the process services all of the requests from the user that spawned it. Under the multi-processing model, each process has its own separate memory space for use in accessing (e.g., storing and processing) data.

Multi-processing is effective for supporting multiple users concurrently; however, it has severe scalability limitations. This is due mainly to two factors. First, spawning and maintaining a process involves a significant amount of overhead. Because of the high cost, only a small number of processes can be maintained at any one time. Second, the same set of data, used by multiple processes, may be stored redundantly; once in each process' memory space. This redundancy can waste a significant amount of system resources.

To overcome some of the limitations of multi-processing, the multi-thread model was developed. According to the multi-thread model, there is only one execution of the software. That is, only one process is spawned. From this one process, multiple threads can be spawned to perform the work necessary to service user requests.

Multi-threading has several advantages over multi-processing. First, because only one process is spawned, overhead is kept to a minimum. It is true that each thread carries with it some overhead cost, but this cost is negligible when compared with the cost of maintaining an entire process. Because multi-threading significantly reduces system overhead, many more users can be supported. Another advantage of multi-threading is that it minimizes the redundant storage of data. Because all of the threads are part of the same process, all of the threads can share the same memory space. This in turn makes it easier to implement a shared cache, where it is only necessary to store a set of data once.

Caches are generally used to provide ready access to data read from or being written to a disk. Caches can be implemented in hardware, software or a combination of hardware and software and can be utilized by any data processing paradigm, including single-process, multi-processing and multi-threading. In a general purpose computing system, a cache system fully supports both the reading of data from and the writing of data to disk. Each block of data stored in a cache can typically be marked by an owning data accessor, such as a process or thread.

In virtual memory systems, a paging system attempts to maintain the most-recently-used pages in the cache. This requires that cached pages are routinely written to disk to make room for new data. A data accessor, however, may require that a particular page remain in cache memory for an extended period of time. To satisfy this requirement, the accessor and the paging system typically interact through a system of locks. While a cached page is locked, the paging system keeps that page in the cache.

Page locks are typically managed by the software written to control the data accessor. In general, an accessor requests a lock on a page through the paging system and waits for the lock request to be satisfied. If the page is currently locked by another accessor, there may be a delay in receiving the lock resource. Once the page is locked, the accessor can rely on that page to remain in cache memory for reads and writes. That is, the paging system will honor the lock and will not swap the page out of memory until the accessor releases the lock.

To operate currently, application software is written and debugged to manage page locks. In large scale computer systems, the human cost of implementing lock management requirements throughout the application is especially high. This cost can escalate in large multi-threadable applications. Hence, there is a need for a simplified page locking system.

SUMMARY OF THE INVENTION

During processing, it can be desirable for a task to lock a particular page of data in memory during a brief period of time to avoid having the data removed from the cache just before the data is needed again. During large processing loops, however, it can be difficult for a task to maintain context about the loop boundaries. As a result, it can be difficult for the task to manage locks, without extensive programming and debugging.

In accordance with a preferred embodiment of the invention, a computing system is provided for softlocking a block of data in memory. While a page is softlocked in memory, ownership of the page lock can migrate between user accessors in response to softlock requests. Once a user accessor obtains a softlock, however, it can continue to rely on the lock after ownership of the lock is stolen. In addition to user accessors, a paging manager can steal the lock to swap the page buffer out of memory.

In accordance with a preferred embodiment of the invention, the paging manager executes in the computer to control blocks of data stored in memory. A plurality of user accessors, each having a respective local memory, can execute in the computer for requesting data items from the stored blocks of data. A softlock action is initiated from a user accessor by requesting data from a particular stored page.

There are three main components in a preferred system used for softlocking pages of data in a cache memory: 1) a local memory assigned to a user accessor, 2) for each user accessor, an associated global user memory controlled by various resource managers, including the paging manager, and 3) a page control block (PCB) for each page buffer. Pointers to each softlocked page are stored in the local memory of the locking user accessor. A global data structure in the global user memory includes a lock list controlled by the paging manager and a lock list cleanup bit. The lock list has one entry for each locked page accessible to the user accessor and each entry includes a field for a global page slot pointer and an accessor pointer. The PCB includes fields for a lock counter, a softlock bit, and an owner pointer.

When a user accessor requests a page to be softlocked, it passes the address of a user page slot pointer field stored in local memory. In response, the paging manager creates an entry in the lock list (if not already there) and sets the accessor pointer to the passed address. The local page slot pointer and the global page slot pointer are set by the paging manager to point to the locked page's PCB. The PCB is modified by incrementing the lock counter and setting the owner pointer to the cleanup bit in global memory. When the lock is released the pointers are systematically removed and the lock counter is decremented.

A softlocked page can be stolen from this user accessor by another user accessor or taken away by the paging manager. In that case, the PCB owner pointer is followed to the cleanup bit, which is set. The PCB owner pointer is then pointed to the new owner and the lock count is incremented. The original locking user accessor can continue relying on the data in the page because it is still locked in memory - the lock is just owned by some other accessor.

Whenever a page event is initiated by an accessor, the cleanup bit is checked by the paging manager. If it is set, the paging manager scans every entry in the lock list for a global page slot pointer leading to an unowned PCB. These pointers and the associated local page slot pointers are removed (or updated if relocking the same page) and the lock counter is decremented. When the list is exhausted, the cleanup bit is cleared.

The above and other features of the invention, including various novel details of construction and combination of parts, will now be more particularly described with reference to the accompanying drawings and pointed out in the claims. It will be understood that the particular system for locking data in a shared cache embodying the invention is shown by illustration only and not as a limitation of the invention. The principles and features of the invention may be embodied in varied and numerous embodiments without departing from the scope of the invention.

DETAILED DESCRIPTION OF PREFERRED EMBODIMENTS OF THE INVENTION

Figure 1:
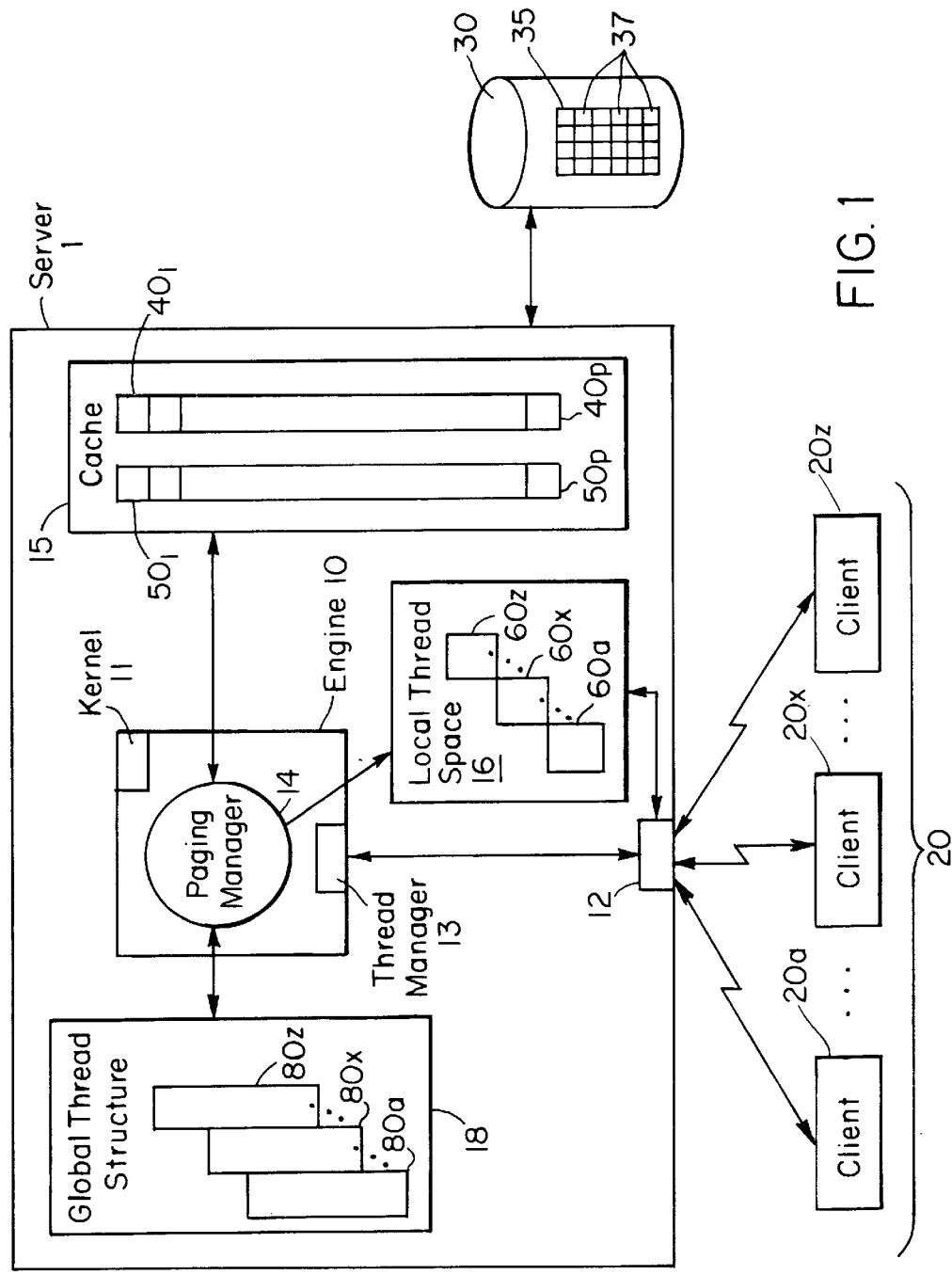
FIG. 1 is a schematic block diagram of a preferred computing system in accordance with the invention.

FIG. 1 is a schematic block diagram of a preferred computing system in accordance with the invention. The computing system is preferably an on-line analytical processing (OLAP) system, which offers decision support capabilities, including forecasting, what-if scenarios and financial modeling. A server computer 1 services requests from users at a plurality of client computers $20a, \ldots, 20x, \ldots, 20z$ for access to data stored on a disk 30. The server 1 preferably includes an OLAP engine 10 comprising a kernel 11, a thread manager 13 and a paging manager 14. The disk 30 includes a database 35 having data stored therein as pages of data 37. In a preferred embodiment of the invention, there are 4K bytes per page, although other page sizes can be chosen.

In accordance with the invention, data accessors, such as processes and threads, execute computer instructions within the server 1 to access data. In particular, a threaded data accessor will be understood to be any computer-implemented mechanism for executing a task and having sharable memory. In accordance with one aspect of the invention, the OLAP engine 10 is a single, multi-threaded application and, for each client, a single user thread is executed per server session. In accordance with another aspect of the invention, data accessors can execute as subprocess threads in a general multi-threaded computing environment. For ease of discussion, the invention will be described in terms of single-threaded tasks, although multi-threaded tasks are considered to be within the scope of the invention.

Embodiments of the invention preferably take the form of computer executable instructions embedded in a computer-readable format on a CD-ROM, floppy disk or hard disk, or another computer-readable distribution medium. These instructions are executed by one or more processors (not shown) to implement the engine 10. A particular embodiment of the invention is commercially available as Oracle Express Server, version 6.0, from Oracle Corporation.

In particular, the OLAP engine 10 receives requests from the client community 20 through a listener interface 12. The client requests are processed by the paging manager 14 which ensures that the requested data is stored in a cache memory area 15 of a virtual memory system. The cache 15 includes page buffers or slots $40_1, \ldots, 40p$ for buffering a plurality of the data pages 37 from the disk 30. Each page slot $40_1, \ldots, 40_p$ has an associated page control block (PCB) $50_1, \ldots, 50_p$. Each PCB includes control information for the buffered page for use by the paging manager 14. User threads are preferably executed asynchronously by the server 1 as data accessors for affecting data transfers between the cache 15 and the mass storage device 30.

The OLAP engine 10 also controls a thread space 16 and a global user structure 18. The thread space 16 includes a local thread memory $60a, \ldots, 60x, \ldots, 60z$ for each allocated user thread. In a particular preferred embodiment, there is one thread per each user session from a client $20a, \ldots, 20x, \ldots, 20z$ active on the server 1. The thread manager 13 of the OLAP engine 10 creates and destroys the thread memory when a client user logs in to or logs out from the OLAP engine 10. The global thread structure 18 includes a global thread memory $80a, \ldots, 80x, \ldots, 80z$ for each user thread known to the paging manager 14. Unlike the thread space 16, the global thread structure is created, managed, and destroyed by the paging manager 14, not the thread manager 13. As will be described in greater detail below, the paging manager 14 relies on information being stored in the global thread structure 18, even after termination of a user thread.

Figure 2:
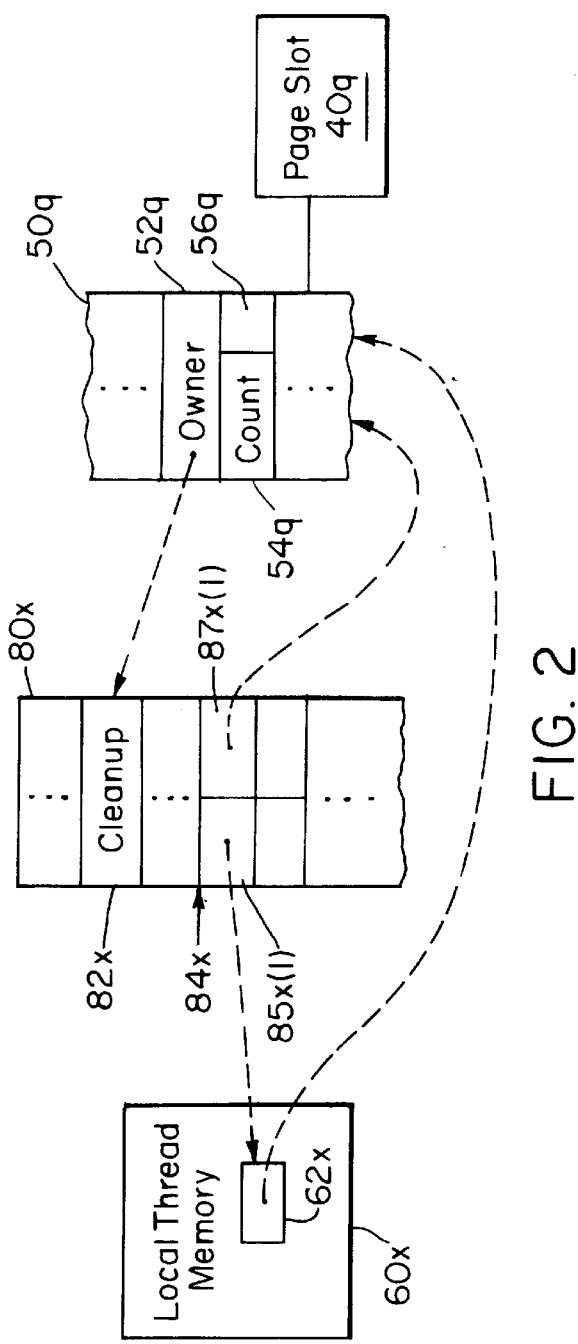
FIG. 2 is a schematic block diagram illustrating details of a local thread memory area, a global thread memory area and a page control block of FIG. 1.

FIG. 2 is a schematic block diagram illustrating details of a local thread memory $60x$, a global thread memory $80x$ and a page control block 50*q* of FIG. 1. As illustrated, the local thread memory 60*x* for a client user 20*x* includes a storage location 62*x* for a thread page slot pointer. Associated with the local thread memory 60*x* is a global thread memory 80*x* which includes a cleanup bit 82*x* and a lock list 84*x*. Each entry in the lock list 84*x* includes a thread pointer field 85 and a global page slot pointer field 87. A locked page slot 40*q* has an associated PCB 50*q*, which includes an owner field 52*q*, a lock counter field 54*q* and a softlock bit 56*q*. The thread page slot pointer 62*x*, the global thread memory 80*x* and the PCB 50*q* are cooperatively managed by the paging manager to softlock a page into memory.

Also illustrated, by dashed lines, are the relationships between the various softlock fields. Specifically, the thread pointer field 85*x*(1) references the thread page slot pointer field 62*x*, which references the PCB 50*q*. The global page slot pointer 87*x*(1) also references the PCB 50*q*. The owner field 52*q* references the cleanup bit 82*x*. The lock counter field 54*x* reflects the number of user threads relying on the data in the associated page slot 40*x* to remain in the cache 15. These relationships between the local thread memory 60*x*, the global thread memory 80*x* and the PCB 50*q* are important aspects of the paging system.

The operations necessary to softlock and unsoftlock a page can be initiated by an explicit call from a user thread. Certain functions are also performed transparently in response to a page event. Examples of a page event include accessing a page of data, which may or may not be stored in the cache. The paging manager 14 responds to the explicit calls and page events to invoke softlocking operations.

Figure 3:
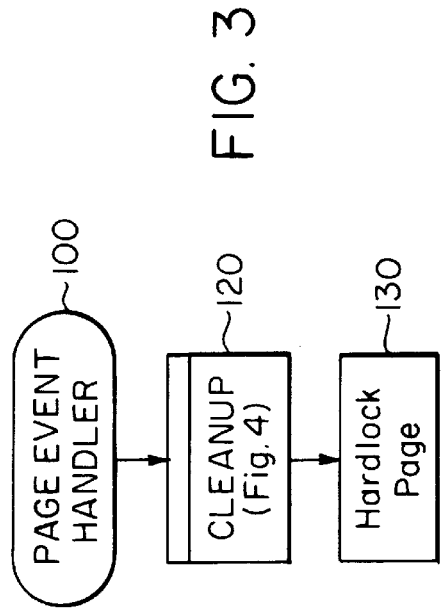
FIG. 3 is a partial flow chart of a preferred paging event handler in accordance with the invention.

FIG. 3 is a partial flowchart of a preferred page event handler in accordance with the invention. In response to a page event, the page event handler 100 first performs a cleanup operation at step 120. The cleanup operation is needed to perform housekeeping on the global user memory 80*x*. A hardlock operation is then performed at step 130. In accordance with a preferred embodiment, a thread normally only hardlocks a single page at any one time, although multiple pages can be hardlocked using explicit hardlocking calls. In particular, the last accessed page (if any) is unlocked and the newly accessed page is locked. The remainder of this description will focus on softlocking aspects of the invention.

Figure 4:
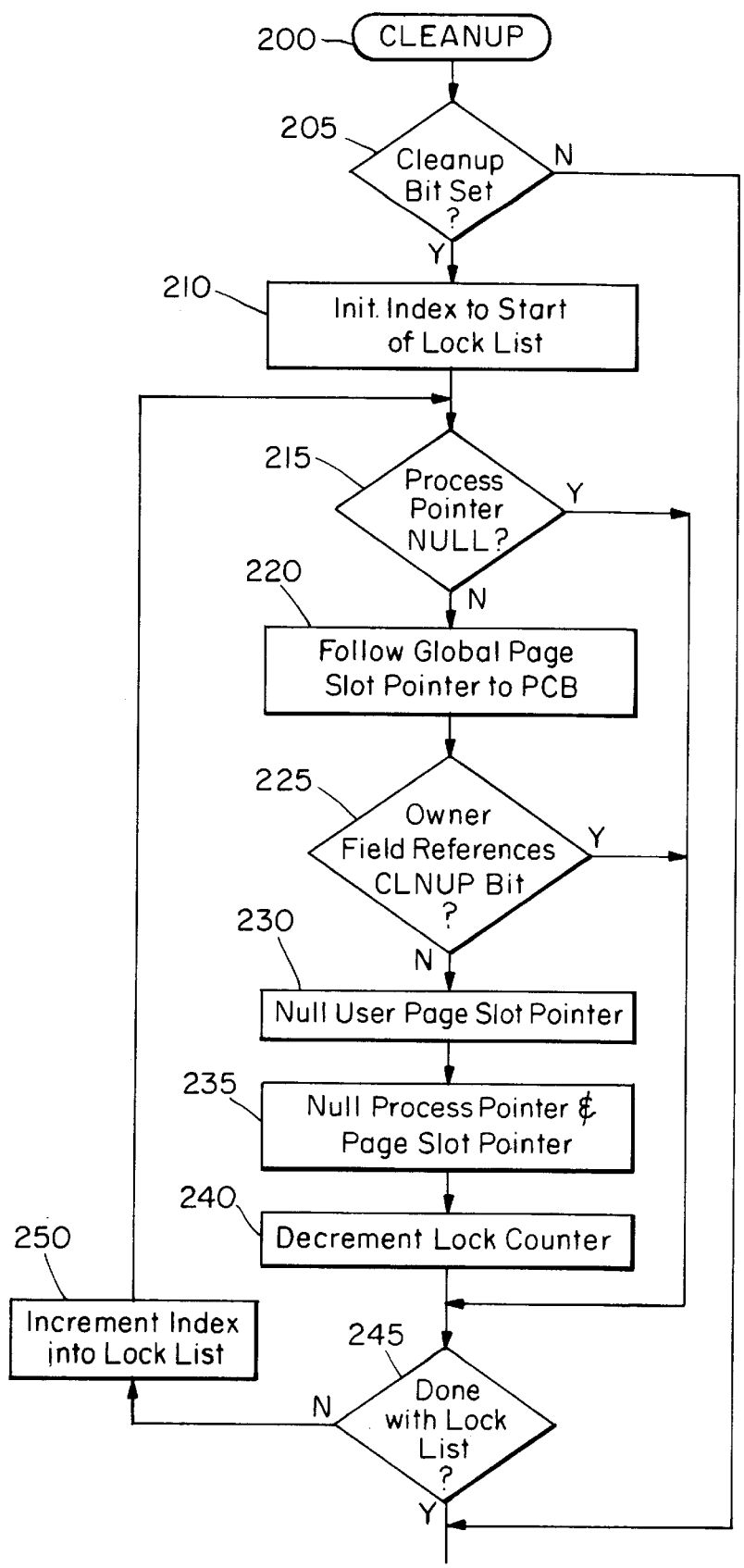
FIG. 4 is a partial flow chart of a preferred cleanup operation in accordance with the invention.

FIGS. 4 is a partial flowchart of a preferred cleanup operation in accordance with the invention. The cleanup operation 200 is invoked by the page event handler 100 (FIG. 3, step 120). At step 205, the paging manager 14 checks the cleanup bit 82*x*. If the cleanup bit 82*x* is not set, then no cleanup is required and the operation is complete.

If cleanup is required, as indicated by a set cleanup bit 82*x*, then there is at least one softlock which has been stolen by another user thread or taken away by the paging manager 14. Processing then continues to step 210 where the paging manager 14 initializes an index (i) to the start of the lock list 84*x*.

At step 215, the thread pointer 85*x*(i) of the current (i) entry in the lock list 84*x* is checked. If it is null, then this entry is not relevant to softlocks (i.e., this is a hardlock) and processing jumps to step 245. If the thread pointer 85*x*(i) is not null, then the associated global page slot pointer 87*x*(i) is followed to the PCB 50*q* controlling the locked page slot 40*q*.

At step 225, the owner field 52*q* in the PCB 50*q* is checked to see if it points to the cleanup bit 82*x* in the associated global thread memory 80*x*. If it does, then this page slot 40*q* is owned by this user thread. If the page slot 40*q* is owned by this thread, processing jumps to step 245 because there is nothing to cleanup with this entry. On the other hand, if the owner field 52*q* does not point to the associated global thread memory 80*x*, then the paging manager sets the thread's page slot pointer 62*x* to null at step 230. At step 235, the paging manager 14 removes the lock list entry. At step 240, the lock counter 54*q* in the PCB 50*q* is decremented.

At step 245, the paging manager checks to see that it is finished with all the entries in the lock list 84*x*. If not, then the index (i) is incremented at step 250 and processing returns to step 215. Otherwise, the operation is completed.

Figure 5:
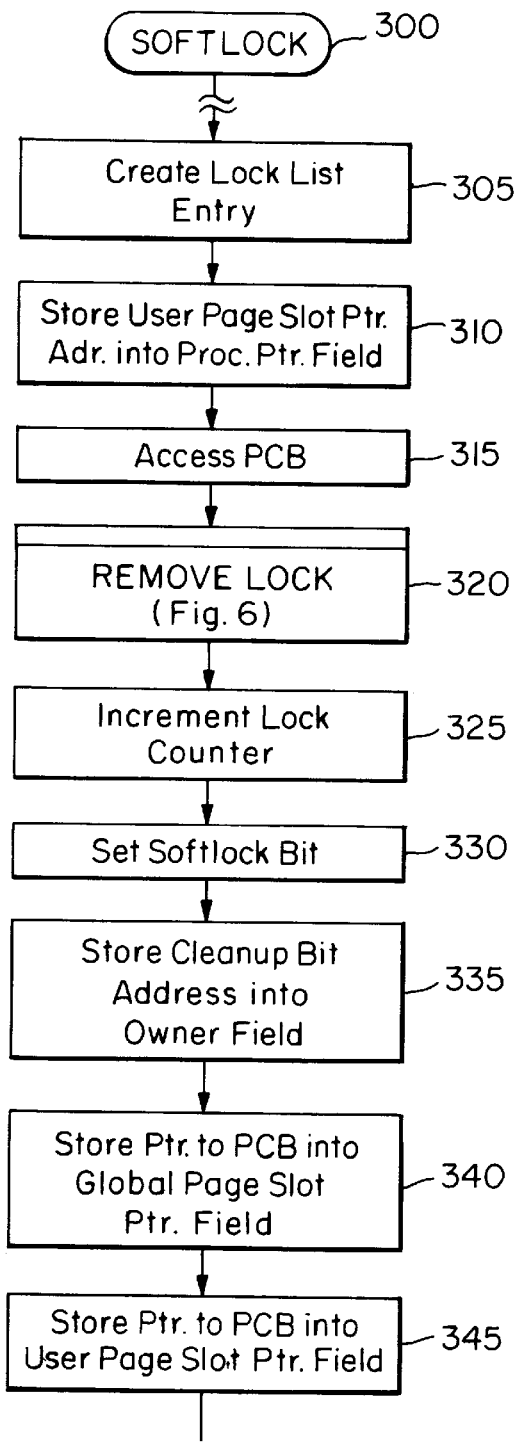
FIG. 5 is a flowchart of a preferred softlocking operation in accordance with the invention.

FIG. 5 is a flowchart of a preferred softlocking operation in accordance with the invention. The softlock operation 300 is preferably invoked by an explicit call from a user thread. As part of this call, a pointer to the thread page slot pointer field 62*x* is preferably passed as an argument. At step 305, a new lock list entry is created for this softlock at step 310. It should be recognized that if this user thread had already locked this page slot 40*q*, then that lock has been subsequently stolen. The cleanup operation has, by this point, removed the previous lock list entry.

Figure 6:
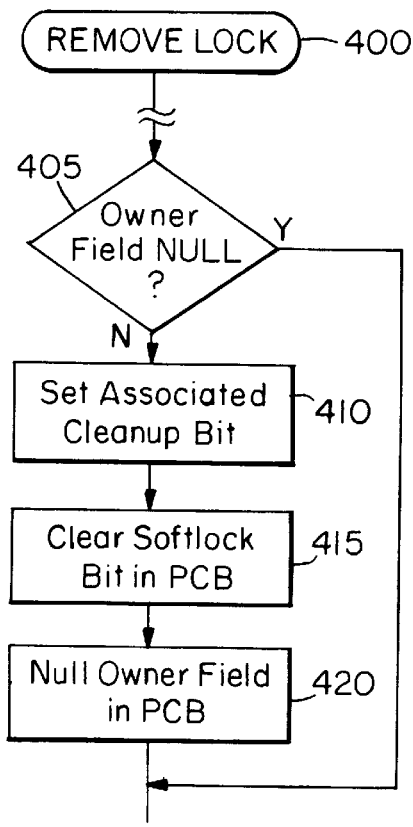
FIG. 6 is a flowchart of a preferred operation to prepare a page slot for softlocking in accordance with a preferred embodiment of the invention.

At step 310, the pointer to the thread page slot pointer field 62*x* is stored in the process pointer field 85*x*(i). At step 315, the paging manager 14 accesses the PCB 50*q*. At step 320, a call is made to an operation to remove the softlock, if it exists (FIG. 6). Upon return, the softlock is available and the user thread can complete a steal of the softflock.

At step 325, the lock counter 54*q* in the PCB 50*q* is incremented. At step 330, the softlock bit 56*q* is set in the PCB 50*q*. At step 335, the owner field 52*q* in the PCB 52*q* is set to point to the cleanup bit 82*x* in the thread's associated global thread memory 80*x*.

At step 340, the global page slot field 87*x*(i) in the lock list 84*x* is set to point to the PCB 50*q*. At step 345, the paging manager writes the address of the PCB 50*q* to the storage area for the thread page slot pointer 62*x* in the local thread memory 60*x*. Once that is done, the user thread can use the pointer stored in the field 62*x* to directly access the softlocked page 40*q*.

FIG. 6 is a flowchart of a preferred operation to remove a softlock in accordance with the preferred embodiment of the invention. This remove operation 400 can be implicitly called to steal a page softlocked by another thread (FIG. 5, step 320) or explicitly by a user thread to unlock a page. At step 405, the owner field 52*q* in the PCB 50*q* is checked. If the owner field 52*q* is null, then the page is already free to be softlocked. If the owner field 52*q* is not null, then this field points to a cleanup bit 84*x* associated with a thread.

At step 410, the owner pointer 52*q* is followed to the cleanup bit 82*x* in the owning thread's global structure 80*x*. The cleanup bit 82*x* is set at step 410. At step 415, the softlock bit 56*q* is cleared. At step 420, the owner field 52*q* is nulled.

In accordance with a preferred embodiment of the invention, the owner field 52*q* can be also nulled by the paging manager 14 for signalling that the page has been selected to be swapped out of the memory slot 40*q*. In that case a user thread can still steal the softlock on the page to prevent the swap. This is a desired result, because if the page is now needed by a user thread, it should not be released from the cache 15.

Figure 7:
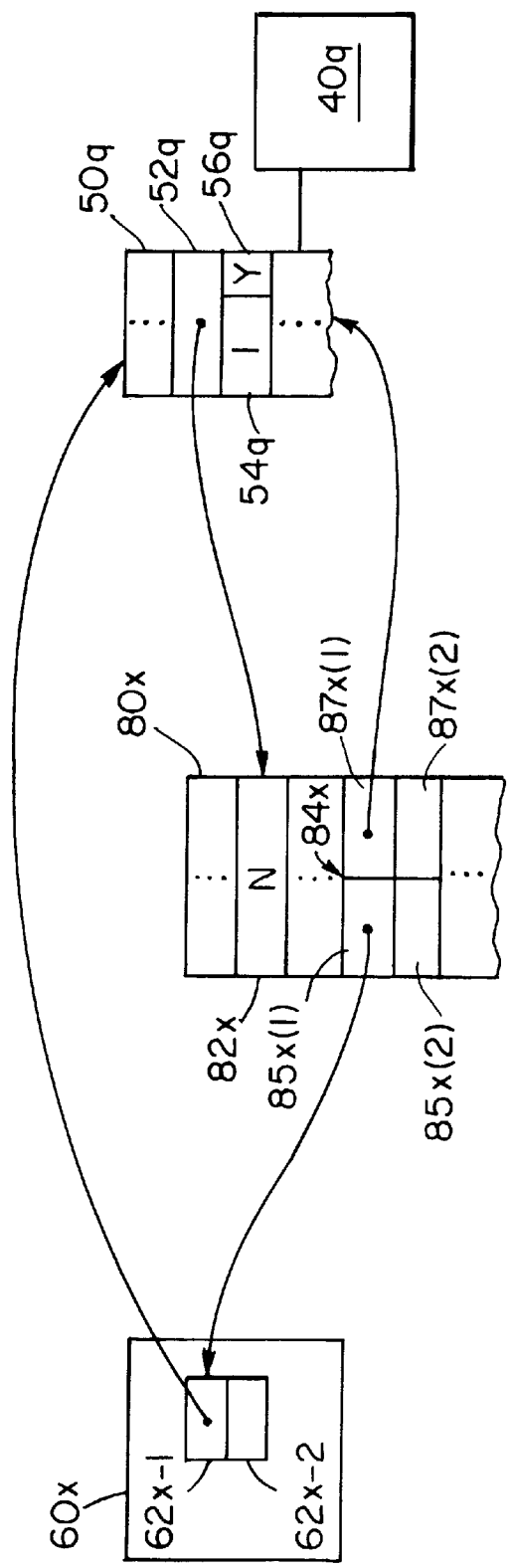
FIG. 7 is a schematic block diagram illustrating an implementation of a lock in accordance with a preferred embodiment of the invention.

FIG. 7 is a schematic block diagram illustrating an implementation of a softlock in accordance with a preferred embodiment of the invention. As illustrated, a first user thread x has softlocked a first page in a page slot 40*q*. In the local memory 60x of the thread, a thread page slot pointer 62x-1 references the PCB 50q for the locked page buffer 40q. As illustrated, in the PCB 50q, the lock counter field 54q is equal to "1" and the softlock bit 56q has been set. The owner field 52q in the PCB 50q points to the cleanup bit 82x in the thread's global memory 80x.

As illustrated, the softlocked page is the first entry in the lock list 84x. As such, the thread pointer 85x(1) references the storage area for the thread page slot pointer 62x-1 in the local thread memory 60x. In addition, the global page slot field 87x(1) points to the PCB 50q.

Figure 8:
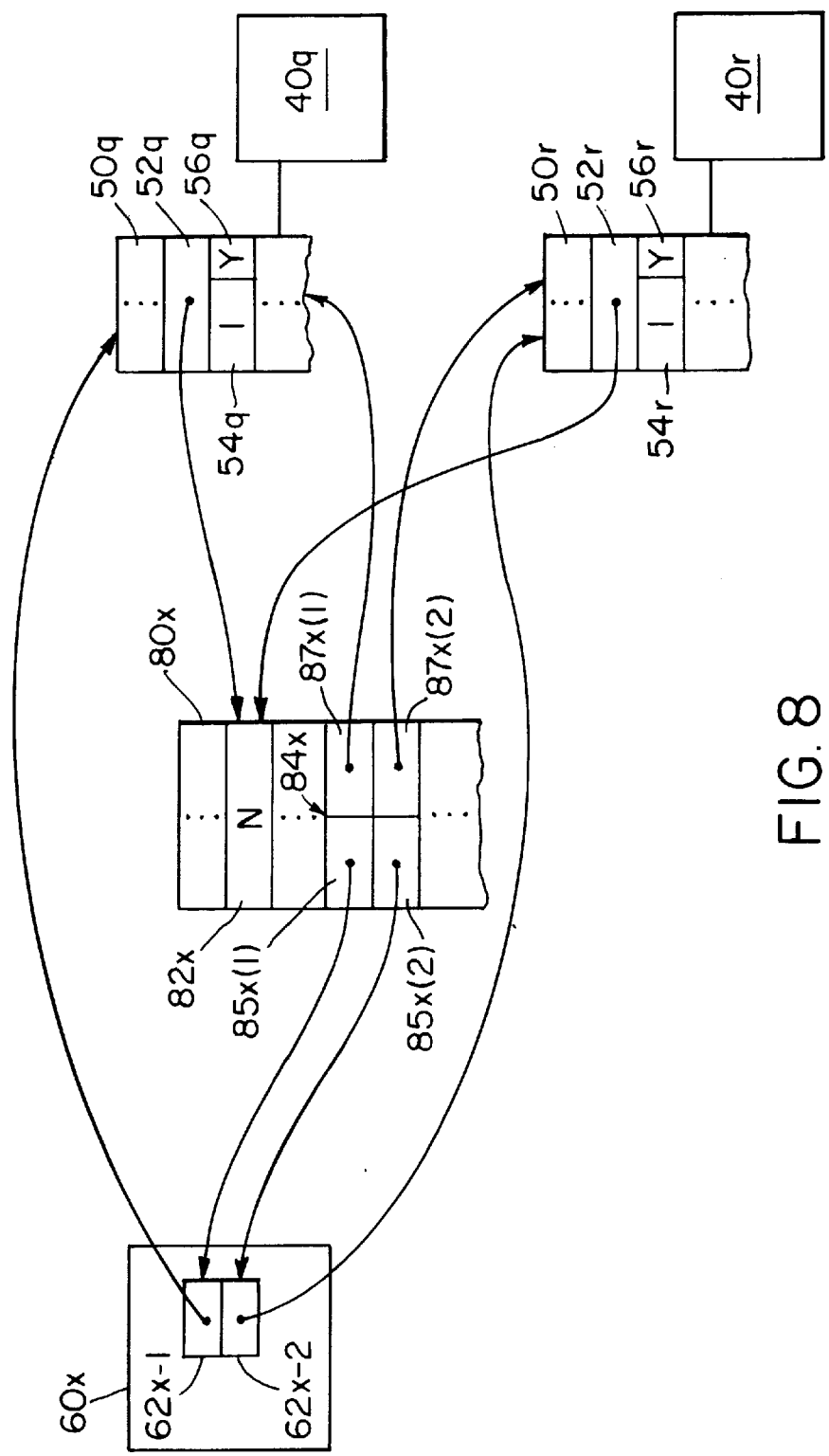
FIG. 8 is a schematic block diagram illustrating an implementation of multiple softlocks in the environment of FIG. 7.

FIG. 8 is a schematic block diagram illustrating an implementation of multiple softlocks in the environment of FIG. 7. As illustrated, the first user thread x has softlocked a second page in a page slot 40r. In the local memory 60x of the thread, a thread page slot pointer 62x-2 references the PCB 50r for the second locked page buffer 40r. As illustrated, in the PCB 50q, the lock counter field 54r is equal to "1" and the softlock bit 56r has been set. The owner field 52r in the PCB 50r points to the cleanup bit 82x in the thread's global memory 80x.

As illustrated, the second softlocked page is the second entry in the lock list 84x. As such, the thread pointer 85x(2) references the storage area for the thread page slot pointer 62x-2 in the local thread memory 60x. In addition, the global page slot field 87x(2) points to the PCB 50r.

Figure 9:
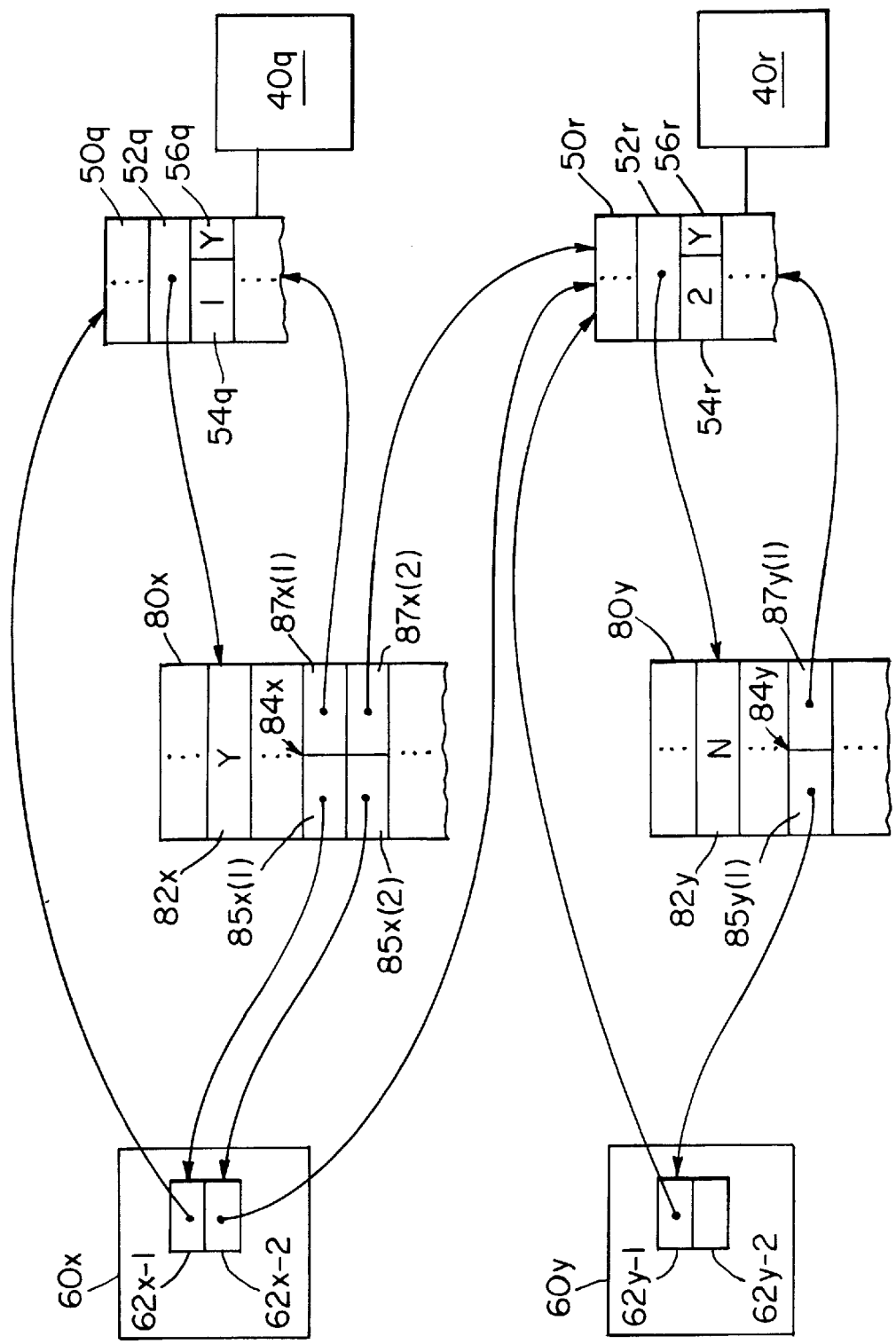
FIG. 9 is a schematic block diagram illustrating a softflock steal in the environment of FIG. 8.

FIG. 9 is a schematic block diagram illustrating a softlock steal in the environment of FIG. 8. As illustrated, a second user thread y has softlocked the second page slot 40r, which was previously softlocked by the first user thread x. In the local thread memory 60y of the second user thread y, the thread page slot pointer 62y-1 references the PCB 50r associated with the locked page buffer 40r. As illustrated, the lock counter field 54r has been incremented to "2" and the softlock bit 56r remains set. The owner field 52r now points to the cleanup bit 82y in the global thread memory 80y for the second user thread y.

As illustrated, the softlocked page is the first entry in the lock list 84y. As such, the thread pointer 85y(1) references the storage area for the thread page slot pointer 62y-1 in the local thread memory 60y. In addition, the global page slot field 87y(1) points to the PCB 50r. The cleanup bit 82x associated with the original locking thread x has been set.

Note that the first user thread x still has a pointer 62x-2 to the stolen page 40r. Therefore, the paging manager 14 keeps the second page in memory and fixed in the page slot 40r until the first user thread x updates its lock list 84x. As described above, the lock list 84x for the first user thread x will be checked during the next page event originating from the first user thread x.

Figure 10:
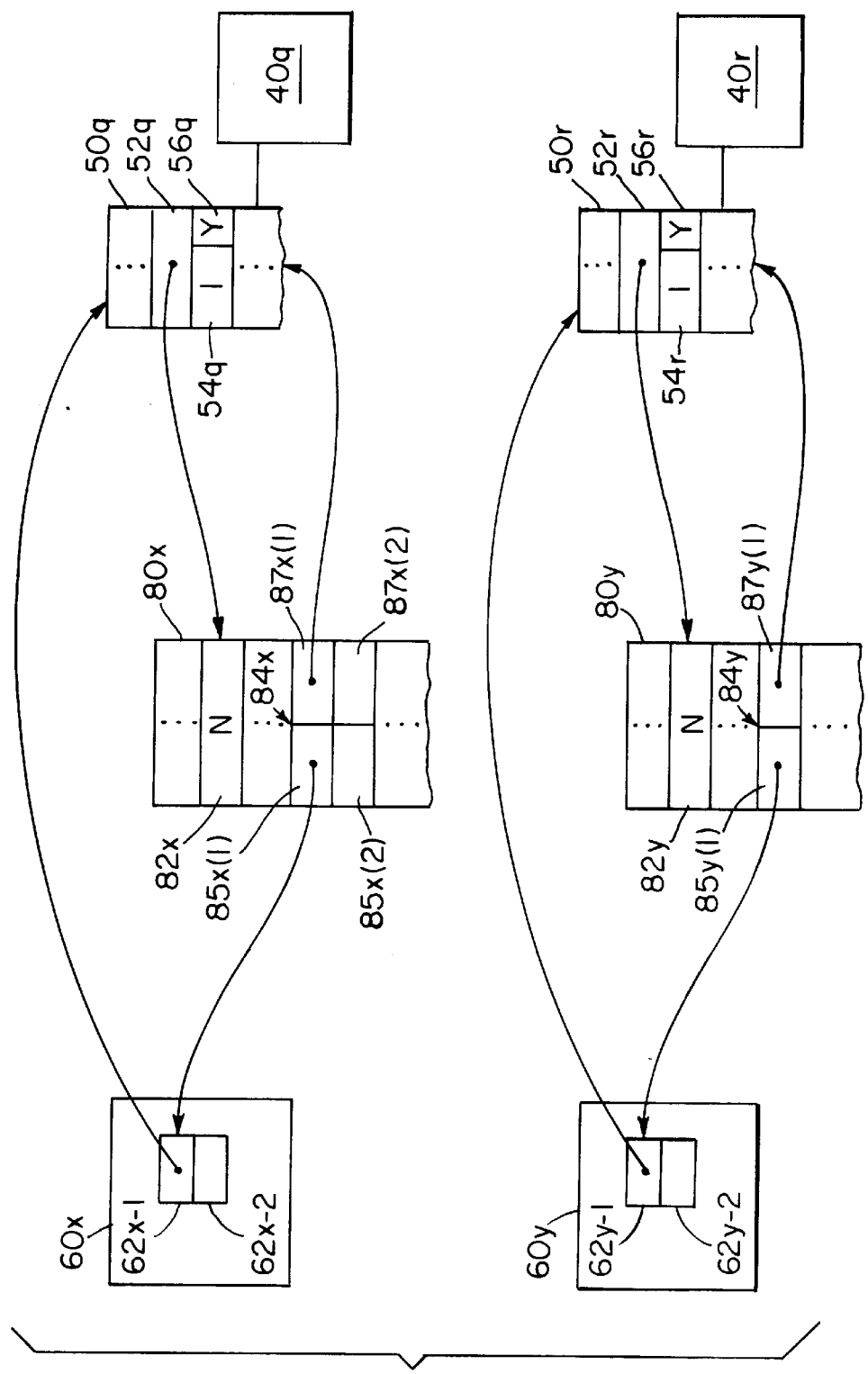
FIG. 10 is a schematic block diagram illustrating a softlock cleanup operation in the environment of FIG. 9.

FIG. 10 is a schematic block diagram illustrating a softlock cleanup operation in the environment of FIG. 9. Upon a page event initiated by the first user thread x, the set cleanup bit 82x triggers the paging manager 14 to scan the lock list 84x. The paging manager 14 recognizes that the global page slot pointer 87x(2) does not reference a PCB owned by this user thread. As such, the thread page slot pointer field 62x-2 referenced by the thread pointer 85x(2) is nulled and the lock list entry fields 85x(2), 87x(2) are nulled. At this stage, the lock counter 54r is decremented to "1" to reflect the removal of the user page slot pointer 62x-2.

Figure 11:
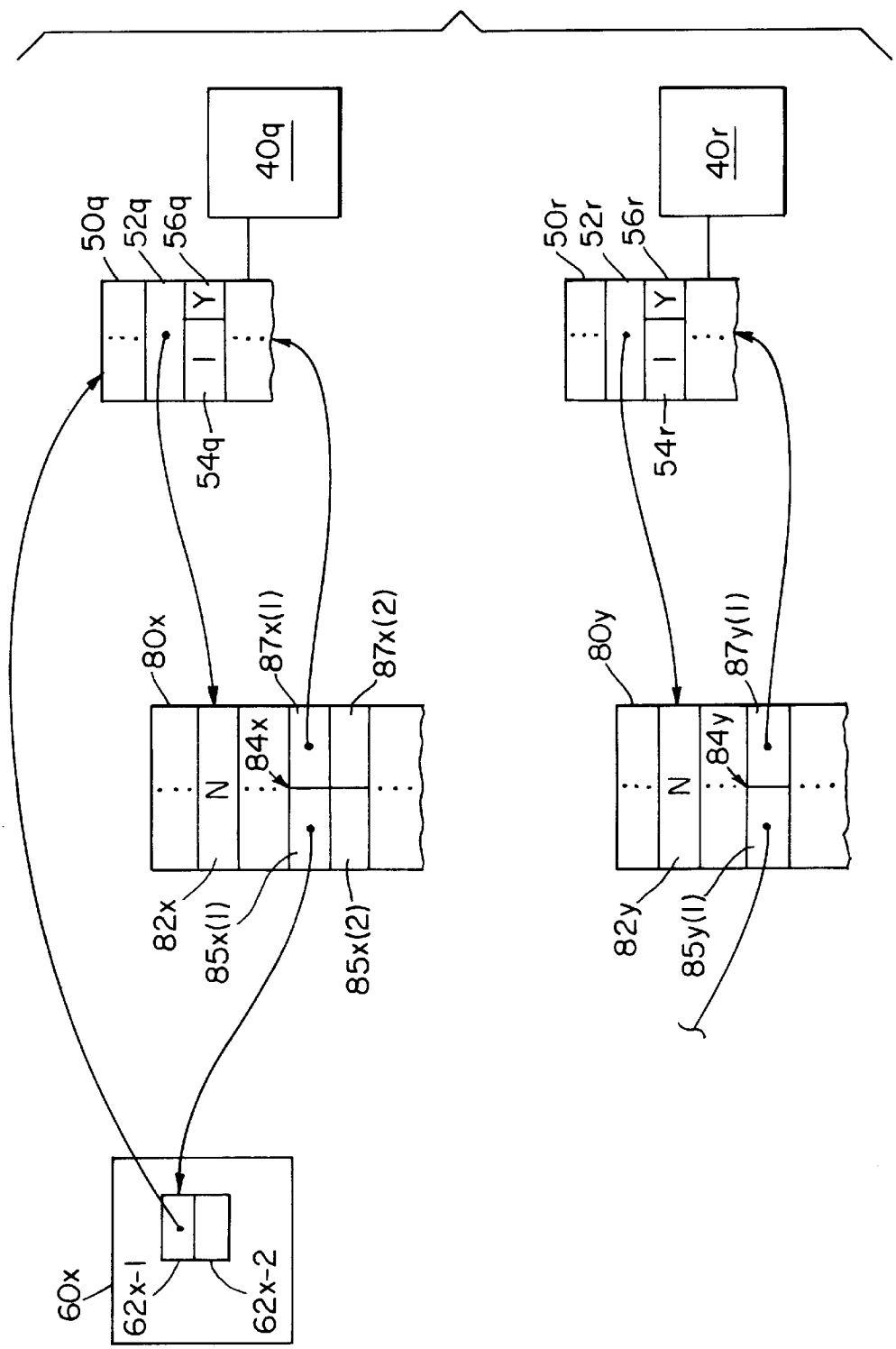
FIG. 11 is a schematic block diagram illustrating a thread termination in the environment of FIG. 10.

FIG. 11 is a schematic block diagram illustrating a thread termination in the environment of FIG. 10. In particular, the second user thread y has terminated; resulting in the deletion of the thread page slot pointer 62y-1 and an invalid address stored for the thread pointer 85y(1). To the paging manager 14, the page slot is still treated as being softlocked. Although the local thread memory 60y has been destroyed by the operating system, the global thread memory 80y remains intact.

Figure 12:
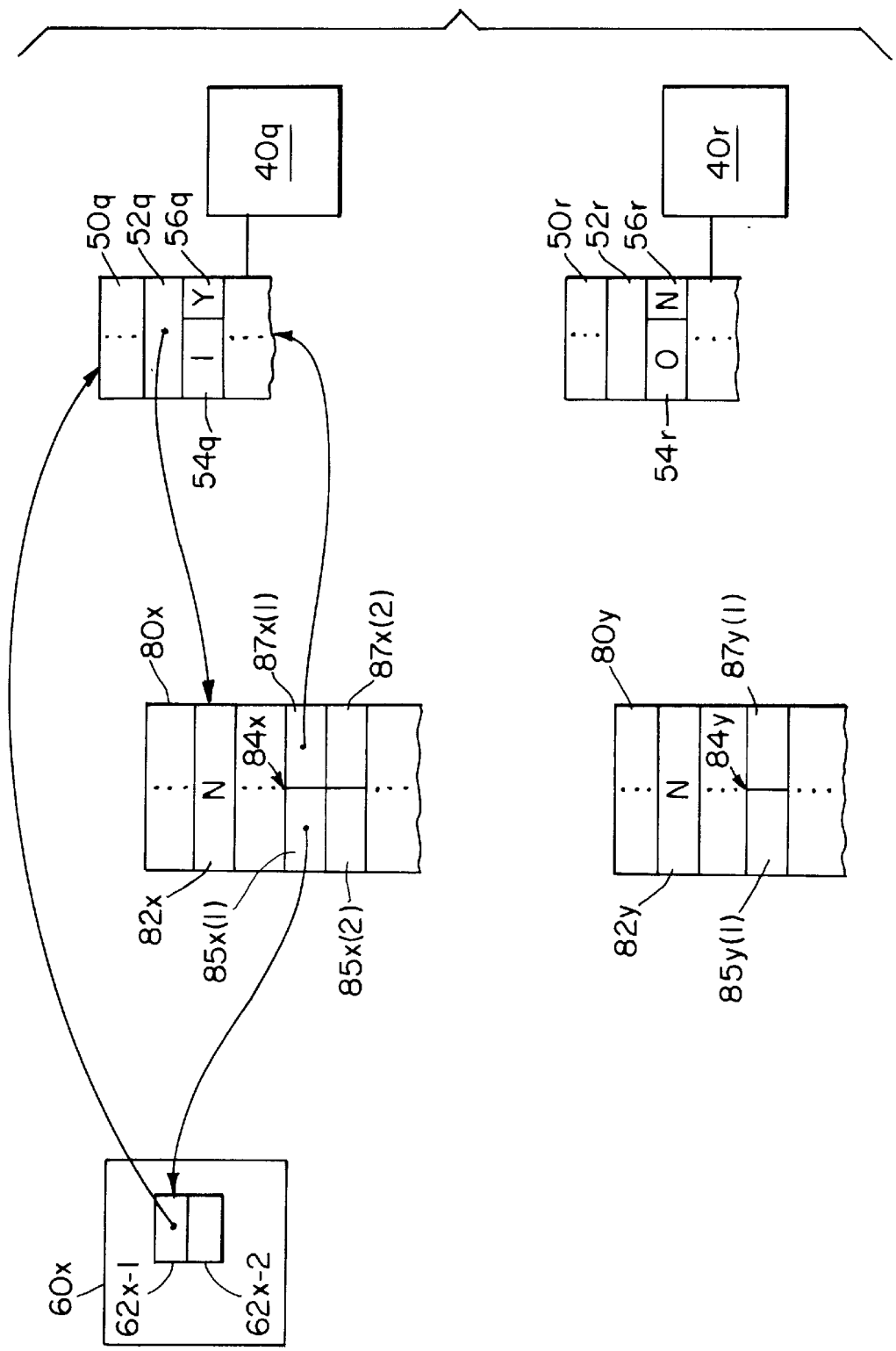
FIG. 12 is a schematic block diagram illustrating a softlock cleanup operation for the thread termination of FIG. 11.

FIG. 12 is a schematic block diagram illustrating a softlock cleanup operation for the thread termination of FIG. 11. Upon receiving notice of the thread termination, the paging manager 14 scans the lock list entries and removes all softlocks. Specifically, the global page slot pointer 87y(1) is followed to the PCB 50r of the softlocked page, where the lock counter 54r is decremented. If the owner pointer 52r references the global thread memory 80y, then the owner pointer 52r is nulled and the softlock bit 56r is cleared. The paging manager can now destroy the global thread memory 80y for the terminated process y.

Note that although the softflock bit 56r is now cleared, there can be other user threads relying on the data in the second page slot 40r. Such a situation will manifest itself as a lock count 54r greater than zero. Until the lock count goes to zero, the paging manager will keep the page in the memory slot 40r.

In accordance with a preferred embodiment of the invention, a user thread can lock pages in the cache 15 without requiring coding and debugging overhead at the user thread level. The user threads are simply programmed to get a softlock when needed without being programmed to later release the softlock. Management of the softlocks is handled by the paging manager 14. This yields performance equivalent to hardlocking without incurring coding overhead.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. In a computer, a method of managing a virtual memory system, comprising the steps of:
    storing a block of data in a memory buffer which is locked by a first accessor to access the data stored therein;
    from a second accessor, requesting the lock on the memory buffer; in response to the lock request, transferring the lock from the first accessor to the second accessor while the first accessor continues accessing the data stored in the memory buffer; and
    allowing the first accessor to continue accessing the data stored in the memory buffer after the second accessor receives ownership of the lock.

2. The method of claim 1 wherein the second accessor locks the memory buffer to swap the stored data out of the memory buffer.

3. The method of claim 1 wherein the first and second accessors are threads in a multi-threaded computing system.

4. The method of claim 1 further comprising the steps of:
    from the first accessor, requesting data from a block of data; and
    in response to a data request, removing an access mechanism between the first accessor and the memory buffer.

5. The method of claim 4 wherein the step of requesting data comprises requesting data from the block of data which is stored in the memory buffer.

6. The method of claim 1 further comprising the steps of:
storing lock data for the first accessor in a global memory structure, the lock data including a first data field referencing the memory buffer and a second data field referencing the first accessor; and
storing a private buffer pointer to the memory buffer in a private memory structure of the first accessor.

7. The method of claim 6 wherein the step of transferring the lock comprises modifying a third data field in the global memory structure.

8. The method of claim 6 wherein the step of transferring the lock comprises removing a reference to the global memory structure from a control data field associated with the memory buffer.

9. In a computer, a method of locking a page of data in memory, comprising the steps of:
in a computer, allocating a cache memory area having a plurality of buffers, each buffer associated with a respective control block;
storing pages of data in respective buffers;
from a first user accessor having a respective first accessor memory in the computer, requesting a lock on a first buffer;
in response to the lock request, performing locking steps comprising:
setting a buffer pointer in the first accessor memory to reference the control block associated with the first buffer;
setting a global accessor pointer associated with the first user accessor to reference the buffer pointer; and
setting an owner pointer in the control block associated with the first buffer to reference a global data field associated with the first user accessor.

10. The method of claim 9 wherein the first user accessor is a thread in a multi-threaded computing system.

11. The method of claim 9 further comprising the step of maintaining the accessibility of buffers by the first user accessor based on a setting of the global data field.

12. The method of claim 11 wherein the step of maintaining comprises clearing the global accessor pointer and the buffer pointer when the owner pointer does not reference the global data field.

13. The method of claim 9 wherein the locking steps are executed by a manager having access to a first block of global memory associated with the first user accessor, the first block of global memory including the global accessor pointer and the global data field.

14. The method of claim 13 wherein the first block of global memory includes a lock list for identifying buffers locked by the first user accessor.

15. The method of claim 12 wherein the lock list includes a list entry for each buffer accessible by the first user accessor, each list entry including a respective global accessor pointer referencing a respective buffer pointer in the first accessor memory.

16. The method of claim 15 further comprising the steps of:
locking the first buffer in response to a request from a second user accessor; and
subsequently accessing the first buffer from the first user accessor.

17. A virtual memory system for a computer, comprising:
a block of data stored in a memory buffer which is locked by a first accessor to access the data stored therein;
a second accessor requesting the lock on the memory buffer;
a mechanism to transfer the lock from the first accessor to the second accessor while the first accessor continues accessing the data stored in the memory buffer; and
a mechanism to allow the first accessor to continue accessing the data stored in the memory buffer after the second accessor receives ownership of the lock.

18. A computer system for locking a page of data in memory, comprising the steps of:
in a computer, a cache memory area having a plurality of buffers, each buffer associated with a respective control block;
pages of data stored in respective buffers;
a locking mechanism responsive to a request to lock a first buffer from a first user accessor having a respective first accessor memory in the computer, the locking mechanism comprising:
a buffer pointer in the first accessor memory referencing the control block associated with the first buffer;
a global accessor pointer associated with the first user accessor referencing the buffer pointer; and
an owner pointer in the control block associated with the first buffer referencing a global data field associated with the first user accessor.

19. An article of manufacture comprising:
a computer-readable medium for use in a computer having a virtual memory system;
a computer-implementable program recorded on the medium to manage the virtual memory system, the program comprising the steps of:
storing a block of data in a memory buffer which is locked by a first accessor to access the data stored therein;
from a second accessor, requesting the lock on the memory buffer;
in response to the lock request, transferring the lock from the first accessor to the second accessor while the first accessor continues accessing the data stored in the memory buffer; and
allowing the first accessor to continue accessing the data stored in the memory buffer after the second accessor receives ownership of the lock.

20. The article of claim 19 wherein the second accessor locks the memory buffer to swap the stored data out of the memory buffer.

21. The article of claim 19 wherein the first and second accessors are threads in a multi-threaded computing system.

22. The article of claim 19 wherein the program further comprises the steps of:
from the first accessor, requesting data from a block of data; and
in response to a data request, removing an access mechanism between the first accessor and the memory buffer.

23. The article of claim 22 wherein the step of requesting data comprises requesting data from the block of data which is stored in the memory buffer.

24. The article of claim 19 wherein the program further comprises the steps of:
storing lock data for the first accessor in a global memory structure, the lock data including a first data field referencing the memory buffer and a second data field referencing the first accessor; and
storing a private buffer pointer to the memory buffer in a private memory structure of the first accessor.

25. The article of claim 24 wherein the step of transferring the lock comprises modifying a third data field in the global memory structure.

26. The article of claim 24 wherein the step of transferring the lock comprises removing a reference to the global memory structure from a control data field associated with the memory buffer.

27. An article of manufacture comprising:

a computer-readable medium for use in a computer;

a computer-implementable program recorded on the medium for locking a page of data in memory, the program comprising the steps of:

in a computer, allocating a cache memory area having a plurality of buffers, each buffer associated with a respective control block;

storing pages of data in respective buffers;

from a first user accessor having a respective first accessor memory in the computer, requesting a lock on a first buffer;

in response to the lock request, performing locking steps comprising:

setting a buffer pointer in the first accessor memory to reference the control block associated with the first buffer;

setting a global accessor pointer associated with the first user accessor to reference the buffer pointer; and setting an owner pointer in the control block associated with the first buffer to reference a global data field associated with the first user accessor.

28. The article of claim 27 wherein the first user accessor is a thread in a multi-threaded computing system.

29. The article of claim 27 wherein the program further comprises the step of maintaining the accessibility of buffers by the first user accessor based on a setting of the global data field.

30. The article of claim 29 wherein the step of maintaining comprises clearing the global accessor pointer and the buffer pointer when the owner pointer does not reference the global data field.

31. The article of claim 27 wherein the locking steps are executed by a manager having access to a first block of global memory associated with the first user accessor, the first block of global memory including the global accessor pointer and the global data field.

32. The article of claim 31 wherein the first block of global memory includes a lock list for identifying buffers locked by the first user accessor.

33. The article of claim 32 wherein the lock list includes a list entry for each buffer accessible by the first user accessor, each list entry including a respective global accessor pointer referencing a respective buffer pointer in the first accessor memory.

34. The article of claim 33 wherein the program further comprises the steps of:

locking the first buffer in response to a request from a second user accessor; and subsequently accessing the first buffer from the first user accessor.

* * * * *